March 3, 1970     H. D. SEXTON     3,498,345
SIMULTANEOUSLY ADJUSTABLE SAW MOUNT AND MITERING DEVICE
Filed Aug. 30, 1967
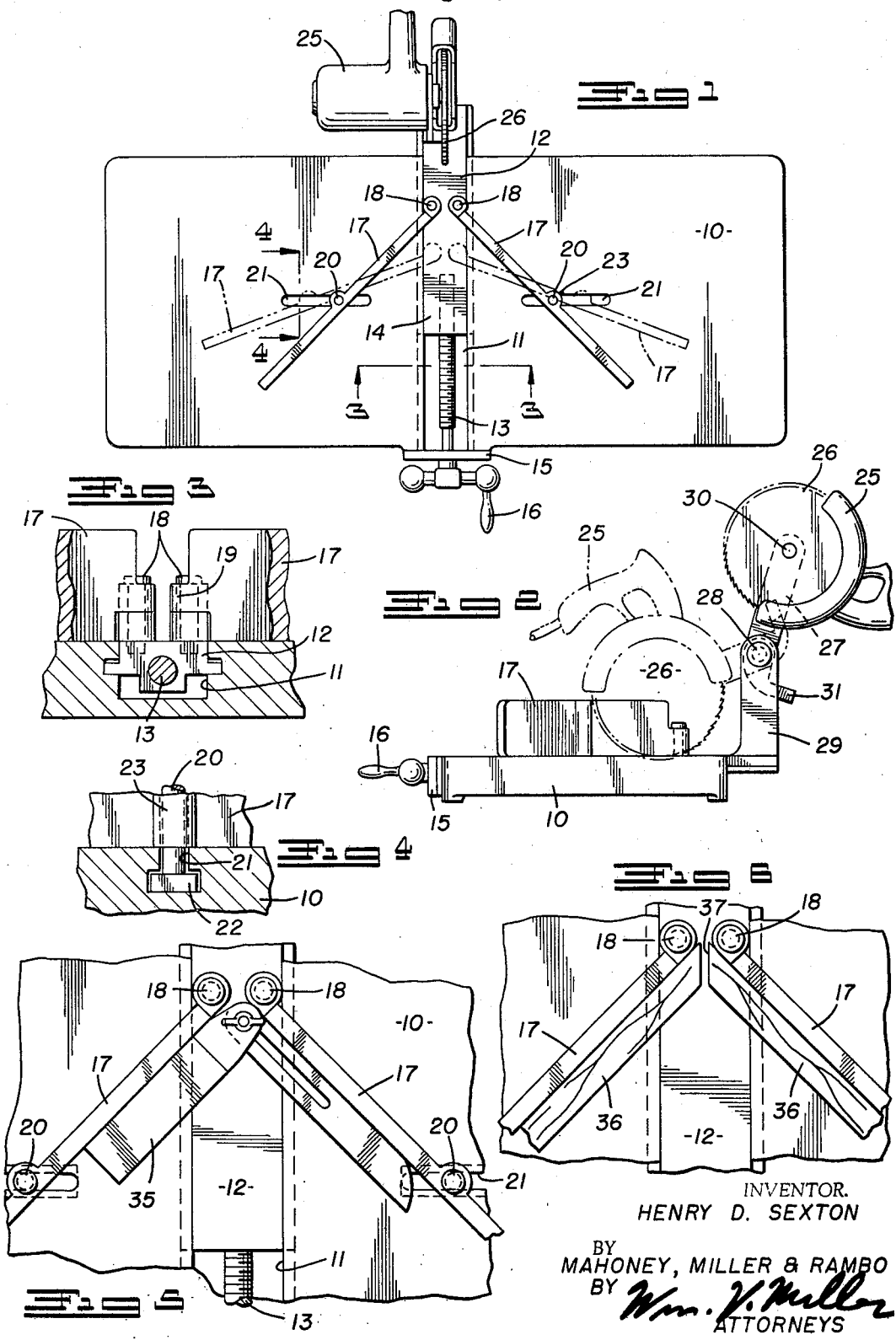
INVENTOR.
HENRY D. SEXTON
BY
MAHONEY, MILLER & RAMBO
BY
*Wm. J. Miller*
ATTORNEYS United States Patent Office 3,498,345
Patented Mar. 3, 1970

3,498,345
SIMULTANEOUSLY ADJUSTABLE SAW MOUNT
AND MITERING DEVICE
Henry D. Sexton, Columbus, Ohio, assignor to Miter
Associates, Ltd., a limited partnership
Filed Aug. 30, 1967, Ser. No. 664,506
Int. Cl. B27b 27/06
U.S. Cl. 143—6                                            3 Claims

ABSTRACT OF THE DISCLOSURE

A combined saw mount, preferably for a power saw, and a mitering device which includes guides for properly positioning the material to be cut relative to the saw blade of the saw carried by the mount so as to cut a predetermined angle thereon. The guides are opposed and angularly disposed relatively with the saw mount adapted to position the saw blade at the vertex of the included angle formed therebetween in bisecting relationship therewith. The saw mount and guides are adjustably mounted and connected for simultaneous adjustment so that adjustment of the guides to reproduce a predetermined included angle between the guides also results in simultaneous adjustment of the saw mount thereof so that the saw blade will always be maintained in proper position relative to the vertex of the angle between the guides to bisect that angle so as to cut the material in contact with either of the guides at the exact mitering angle. By positioning two pieces of the material selectively in contact with the opposed guides complemental angles will be cut by the saw blade on the ends of the respective pieces to form an exact mitered corner when the pieces are subsequently joined, with a single previous adjustment of the guides.

BRIEF DESCRIPTION OF THE DRAWING

In the accompanying drawings, I have illustrated a preferred embodiment of my invention but it is to be understood that specific details may be varied without departing from basic principles of the invention.

In this drawing:

FIGURE 1 is a plan view of the device,

FIGURE 2 is a side elevational view of the device.

FIGURE 3 is an enlarged vertical sectional view taken along line 3—3 of FIGURE 1.

FIGURE 4 is an enlarged vertical sectional view taken along line 4—4 of FIGURE 2.

FIGURE 5 is a schematic view showing the use of an adjustable bevel square to set the guides for a predetermined included angle.

FIGURE 6 is a similar view showing strips of material positioned against the guides and showing the angles cut on the adjacent ends thereof by the previously positioned saw blade in association with the guides.

DETAILED DESCRIPTION OF THE DRAWINGS

With reference to the drawing, the device of this invention is shown as comprising a base plate or table 10 which is preferably of relatively rugged metal material shaped into rectangular form of substantial area. Midway between the ends of this plate is a slideway 11 extending between the front and back edges of the plate and opening upwardly. Disposed in this slideway for reciprocating sliding movement therein is a slide or carriage 12 suitably interfitting therein. This carriage is adjusted back and forth in the slideway by means of a screw 13. This screw has a threaded rear or inner end which screws into and out of a socket 14 formed and tapped in the carriage and extending in the direction of the center line or axis of the carriage and opening forwardly. The screw has its outer end rotatably disposed for non-axial movement in an anchoring plate 15 mounted on the front edge of the plate 10 over the forward end of the slideway 11. Thus, selective rotation of the screw by the handle 16, keyed on its forward end, will move the carriage 12 forwardly or rearwardly in the slideway 11.

A pair of guide plates 17 are adjustably connected with the carriage 12 and the plate 10 as indicated. Each guide is in the form of a plate or strip 17 disposed upright on edge and resting on the upper surface of the plate 10. The rear edge of each strip 17 is pivoted to the carriage 12 by a hinge pin 18 cooperating with interfitting hinge lugs 19 formed respectively on the carriage and the plate. The hinge pin axes 18 are located toward the rear end of the carriage in alignment transversely thereof and close together so that the strips 17 can be swung toward each other into substantial flat face contact or to a position where they extend in opposite directions in substantial alignment. To cause the two strips 17 to swing simultaneously toward or away from each other to the same extent about the pivots 18, pin and slot connections are provided between the respective strips 17 and the plate 10. Each pin and slot connection comprises a pin 20 which fits into a slot 21 extending transversely of the base. The two slots 21 are located substantially midway between the front and rear edges of the plate 10 and are in alignment along a line extending at a right angle to the axis of the carriage 12 or the forwardly and rearwardly extending slideway 11. Each pin 20 has a square head 22 on its lower end fitting slidably into an undercut portion of the slot 21 and has its upper portion rotatable in a vertical socket 23 formed on the cooperating strip 17 intermediate its ends. Thus, it will be apparent that adjustment of the carriage 12 back and forth in the slideway 11 will simultaneously move the pivots 18 forwardly or rearwardly and will cause the guide strips 17 to swing about the pivot pins 18 relative to the carriage while at the same time swing about the pivot pins 20 relative to the plate 10, the latter pins moving as necessary in the slots 21. Thus, back and forth adjustment of the carriage will produce corresponding swinging of the guide strips 17 toward and away from each other. The range of adjustment can be from a position where the strips 17 will be in substantial face contact, that is, with the included angle at 0°, to a position where they extend in opposite directions in alignment, that is, with the included angle at 180°.

The carriage 12 is not only connected to the guide strips 17 but also is provided with means for supporting a power saw 25 with its blade 26 so that it is swingable in a vertical plane adjacent the guides 17, the plane of the blade passing through the axis of the carriage between the pivots 18 which are located on opposite sides of the axis at equally spaced positions. The saw may be any of the standard types and is carried by a swingable arm 27 which is pivoted by a transverse horizontal pivot 28 to the upstanding bracket 29 carried by the rear end of the carriage 12. The arm 27 may be connected to the saw 25 at the shaft 30 which carries the saw blade. In the full line position shown in FIGURE 2, a stop portion 31 on the arm 27 engages the bracket 29 to position the saw rearwardly and upwardly away from the guides 17 but when the saw is swung forwardly and downwardly, the blade 26 will contact the upper surface of the carriage 12, as indicated by the broken lines, and will be positioned between the inner pivots 18 of the strips 17.

Adjustment of the carriage will vary the included angle between the guide strips 17 but the saw mounting bracket 29 will move with the carriage so that the blade 26 will always be swingable into its predetermined position between the inner ends of the strips 17 in bisecting relationship to the included angle therebetween.

FIGURES 5 and 6 illustrate the use of this device, for example, in producing a mitered corner it often happens that these corners are not exactly at right angles, especially in older buildings. To miter such corner, a bevel square 35 is first positioned in the corner and is adjusted and set at the angle of the corner. Then it is positioned between the guides 17, as shown in FIGURE 5, and the handle 16 is then turned to position the guides in contact with the arms of the adjusted and set square 35. This will be the correct angle to be reproduced in the mitering of the corner between the strips 36 which are to be joined at the corner, these strips being shown in FIGURE 6. In adjusting the angular relationship of the two guide strips 17 to correspond to the angle of the bevel square 35, the turning of the handle 16 moves the carriage 12 to simultaneously swing the guide strips 17 and move the saw mount bracket 29 forwardly and rearwardly. In other words, the bracket 29 is always maintained in a predetermined relationship to the pivots 18, being in a vertical plane which passes through the axis of the carriage. Thus, regardless of the adjustment of the strips 17, that is, whether they are swung toward or away from each other to vary the included angle therebetween, when the saw 25 is swung forwardly and downwardly, the blade 26 thereof will always be in a bisecting position relative to the angle included between the strips 17. This angle may vary from 0° to 180°. After the angle is set as indicated above, each of the strips 36 may be properly positioned in association with the corresponding guide strip 17 and then the saw may be operated to cut the end 37 of the strip of material at the proper angle. This angle is determined and reproduced by a mere setting of the guides in accordance with the previous setting of the bevel square without the necessity of actually measuring for converting into degrees. Subsequently, the two angled ends 37 may be joined together to form the mitered corner accurately in accordance with the original measurement taken by the square 35.

It will be apparent that this invention provides an adjustment of the mitering guides in accordance with the angle to be reproduced and a simultaneous adjustment of the saw mount so that the saw blade will always be maintained in a predetermined, operative position relative to the mitering guides so as to bisect the included angle therebetween. As previously indicated, this angle may vary considerably and, in fact, between approximately 0° to 180°. This arrangement permits joined complemental angular cuts to be made on the pieces of material set against the respective guides without changing the setting and the cuts will be accurate so that an accurate mitered corner will be produced when the ends of the material are joined together. It is not necessary to swing the saw mount or table in a horizontal plane to make the proper adjustments and it is merely necessary to adjust the carriage forwardly and rearwardly which simultaneously adjusts the saw mount forwardly and rearwardly and the mitering guides angularly to produce the proper angular cuts when the saw is swung downwardly into operative position. The swinging movement of the mitering guides toward and from each other to the same extent is accomplished by having the inner ends of the guides pivoted to the carriage and their outer ends connected to the base plate by pin and slot connections, the slots of these connections extending at right angles to the direction of movement of the sliding carriage.

It will be apparent that this arrangement provides for a simple inexpensive structure which can be manufactured at a relatively low cost and which can be operated by unskilled labor to produce mitered corners even though the corners to be reproduced are not at 90°.

Having thus described this invention, what is claimed is:

1. A saw mounting and mitering device comprising a base, a mitering guide mounted on the base for angular adjustment in accordance with the angle to be cut by the saw mounted on the device, a saw mount on the base for receiving and supporting a saw in a predetermined position relative to the guide but for adjustment on the base, and means for connecting said saw mount and said guide together for simultaneous movement to maintain the said position of the mount relative to the guide upon swinging adjustment of the guide for the purpose of cutting various angles with the saw, said mitering guide comprising a pair of guide members having ends pivoted to the base for swinging movement toward and from each other to provide an included angle with its vertex at said pivots, said saw mount supporting the saw with its blade located to bisect the included angle between said guide members, said connecting means connecting said saw mount and both of said guide members together for simultaneous movement on the base, adjusting means on the base connected to said guide members to swing both of said guide members toward and from each other to the same extent and to simultaneously move said saw mount to maintain its relationship to said guide members, said guide members being disposed on the base with inner and outer ends, a carriage mounted on said base for reciprocation along a predetermined axis, pivots carried by said carriage for pivotally connecting the inner ends of said guide members thereto, pivots for connecting the outer ends of said guide members to said base, said pivots comprising pin and slot connections so that the pivots are free to move along on axes at a right angle to said axis for reciprocation of said carriage, said saw mount being carried by siad carriage in said predetermined position relative to said pivots carried thereby, said saw mount including a saw supporting arm pivoted for vertical swinging to a bracket upstanding from said carriage so that the saw can be swung from an inoperative position upwardly and rearwardly relative to said guide members to a forward and downward operative position in cooperation with said guide members.

2. A device according to claim 1 in which said carriage is carried by a slideway on the base, and a screw for adjusting the carriage along the slideway.

3. A device according to claim 2 in which each of said guide members is an elongated member and its pivot to the carriage is at a fixed position on the carriage, and its pivot at the outer end comprises a pivot pin mounted in a slot in said base, the slots for the two members being on opposite sides of the slideway in alignment with each other and extending at a right angle to the axis of said carriage and said slideway.

References Cited

UNITED STATES PATENTS

| | | | |
|---|---|---|---|
| 1,704,747 | 3/1929 | Kopecky | 143—90 |
| 1,850,695 | 3/1932 | Scott | 143—90 |
| 3,105,528 | 10/1963 | Loughridge. | |

DONALD R. SCHRAN, Primary Examiner

U.S. Cl. X.R.

143—46, 90